(12) United States Patent
Kimura et al.

(10) Patent No.: US 9,398,199 B2
(45) Date of Patent: Jul. 19, 2016

(54) IMAGE CAPTURE APPARATUS CAPABLE OF SHIFTING ELECTRICAL SIGNAL WHEN CENTER OF GRAVITY IS SHIFTED DUE TO AN ECLIPSE OF PUPIL AREA

(71) Applicant: CANON KABUSHIKI KAISHA, Tokyo (JP)

(72) Inventors: Masafumi Kimura, Kawasaki (JP); Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/896,917

(22) Filed: May 17, 2013

(65) Prior Publication Data

US 2013/0329117 A1 Dec. 12, 2013

(30) Foreign Application Priority Data

Jun. 11, 2012 (JP) ................................. 2012-132364

(51) Int. Cl.
*H04N 5/225* (2006.01)
*H04N 5/232* (2006.01)

(52) U.S. Cl.
CPC ............. *H04N 5/2254* (2013.01); *H04N 5/225* (2013.01); *H04N 5/2258* (2013.01); *H04N 5/232* (2013.01); *H04N 5/23212* (2013.01)

(58) Field of Classification Search
CPC ..... H04N 5/232; H04N 5/225; H04N 5/2254; H04N 5/2258; H04N 5/23212
USPC ........................................................ 348/344
See application file for complete search history.

(56) References Cited

U.S. PATENT DOCUMENTS

| 7,687,757 | B1 | | 3/2010 | Tseng et al. | |
|---|---|---|---|---|---|
| 2007/0102619 | A1 | * | 5/2007 | Kusaka | ...................... 250/201.2 |
| 2008/0258039 | A1 | * | 10/2008 | Kusaka | ...................... 250/201.8 |
| 2009/0002526 | A1 | * | 1/2009 | Koishi | .......................... 348/241 |
| 2009/0140131 | A1 | * | 6/2009 | Utagawa | ....................... 250/226 |
| 2013/0162866 | A1 | * | 6/2013 | Kimura | .................... 348/231.99 |
| 2014/0146221 | A1 | * | 5/2014 | Kimura et al. | ................ 348/353 |

FOREIGN PATENT DOCUMENTS

| CN | 1366423 | A | 8/2002 |
|---|---|---|---|
| CN | 101065955 | A | 10/2007 |
| CN | 102246079 | A | 11/2011 |
| CN | 103167240 | A | 6/2013 |
| JP | 2009-175680 | A | 8/2009 |
| JP | 2010-152006 | A | 7/2010 |

OTHER PUBLICATIONS

The above patent documents were cited in a Feb. 29, 2016 Chinese Office Action, which is enclosed with an English Translation, that issued in Chinese Patent Application No. 201310223951.0.

* cited by examiner

*Primary Examiner* — Roberto Velez
*Assistant Examiner* — Abdelaaziz Tissire
(74) *Attorney, Agent, or Firm* — Cowan, Liebowitz & Latman, P.C.

(57) ABSTRACT

An image capture apparatus comprises an imaging optical system, an image sensor, a pupil division unit which limits a light beam entering each pixel on the image sensor to a specific pupil area of the imaging optical system, an incident angle determination unit which determines an incident angle to each pixel on the image sensor, an image shift unit which shifts an electric signal obtained from the image sensor, based on the incident angle determined by the incident angle determination unit and a position of a plane on which image generation is performed, and an image generation unit which synthesizes electric signals obtained from the image shift unit.

11 Claims, 8 Drawing Sheets

FIG. 2A
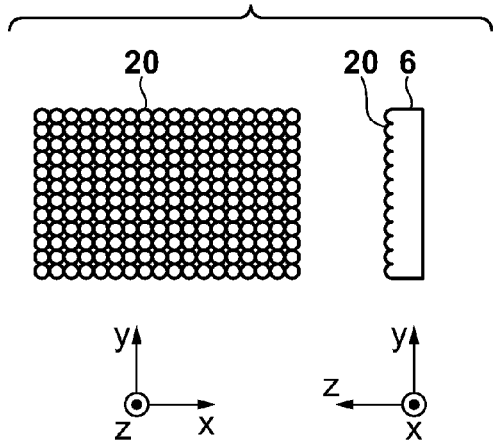
FIG. 2C
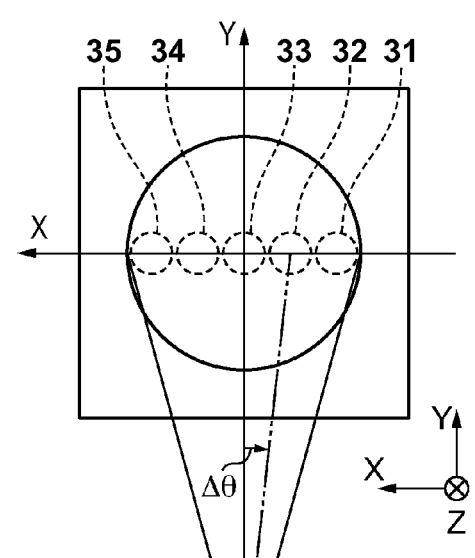
FIG. 2B
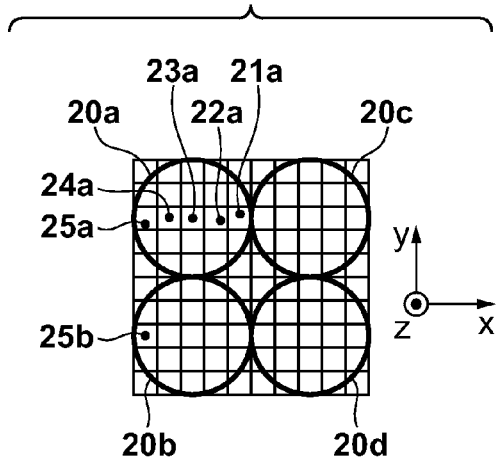
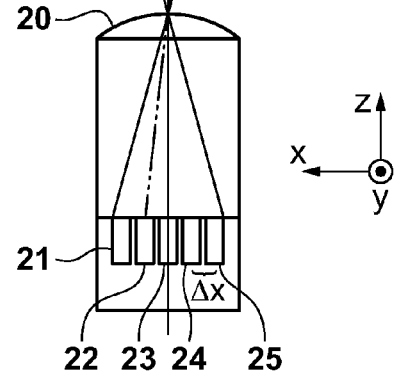

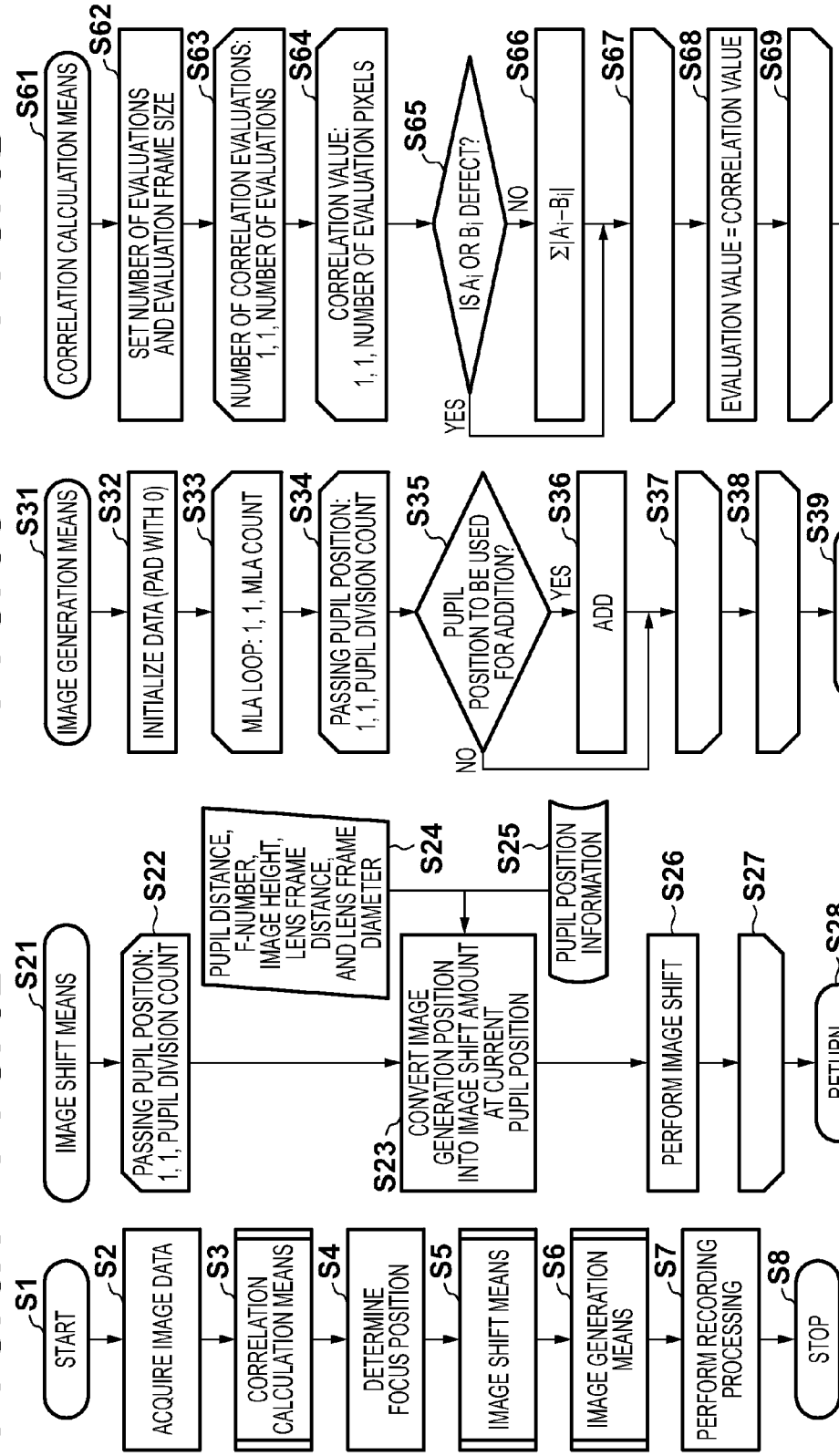

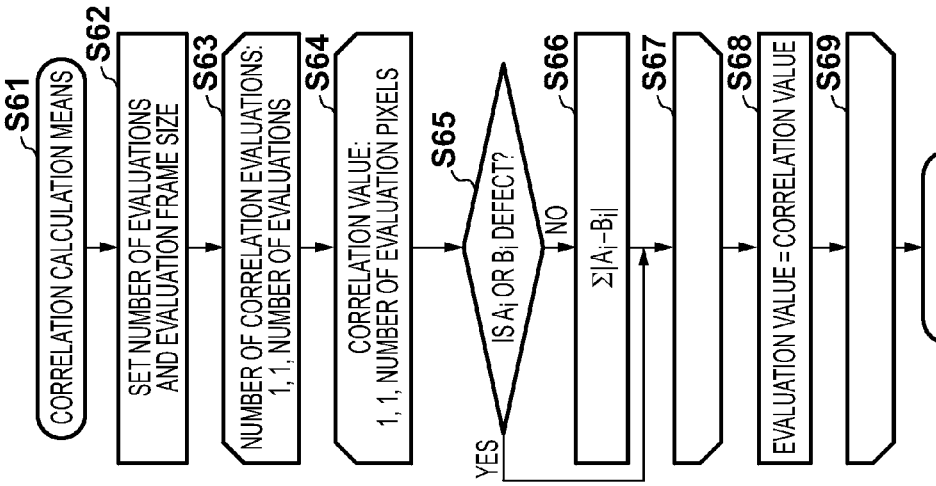
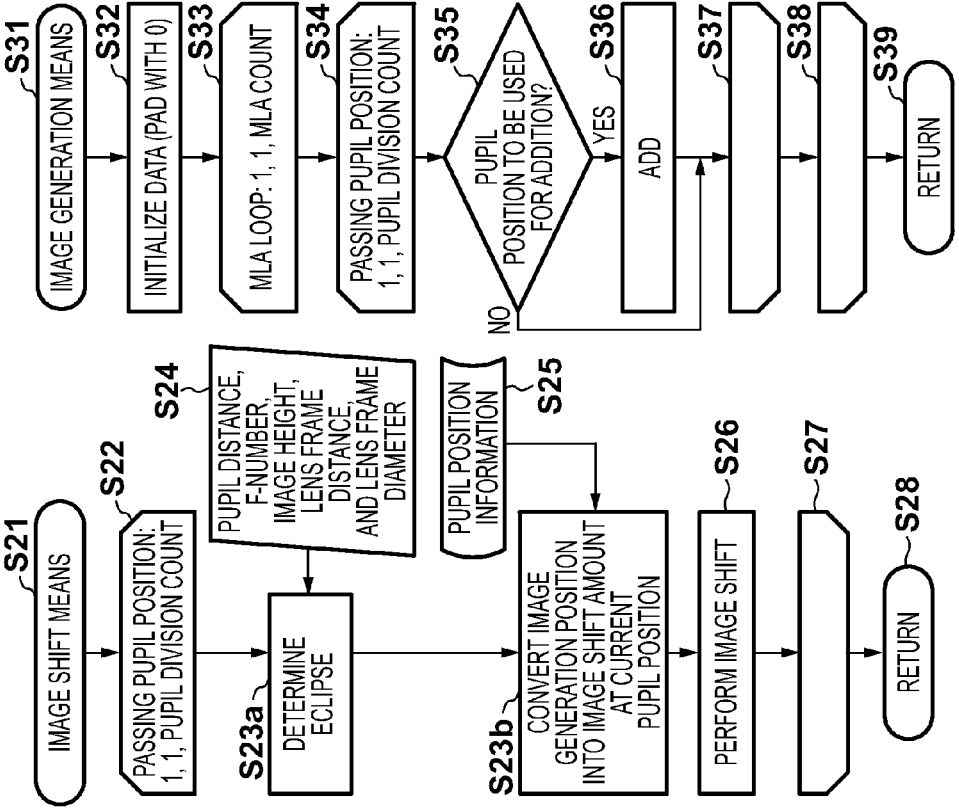
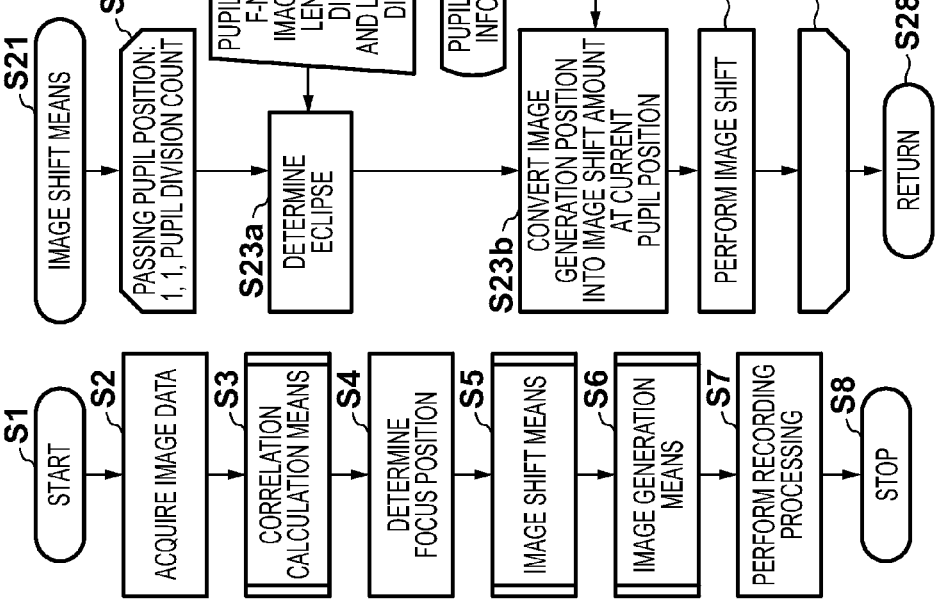

IMAGE CAPTURE APPARATUS CAPABLE OF SHIFTING ELECTRICAL SIGNAL WHEN CENTER OF GRAVITY IS SHIFTED DUE TO AN ECLIPSE OF PUPIL AREA

BACKGROUND OF THE INVENTION

1. Field of the Invention

The present invention relates to an image capture apparatus typified by a digital camera and, more particularly, to a camera signal processing technique capable of acquiring ray space information (also called a light field).

2. Description of the Related Art

Recent digital cameras are gaining sophisticated functions, and technical differentiation is becoming more difficult. As a new camera form, there is proposed a camera capable of acquiring ray space information. Such a camera is popularly called a light field camera or the like. The light field camera can provide a function such as a change of the focus position after shooting by acquiring light beams having passed through different pupil areas, and reconstructing an image to obtain an output image.

The reconstruction processing requires accurate ray information. However, it is sometimes difficult to obtain accurate ray information owing to the influence of, for example, the positioning accuracy of an optical element (a microlens array or the like is used) for acquiring the eclipse state of the photographing lens and ray space information.

To solve this problem, Japanese Patent Laid-Open No. 2009-175680 discloses a light field camera which obviates the need for accurate positioning by recording information of a microlens array and light receiving element array, and appropriately processing it.

Further, Japanese Patent Laid-Open No. 2010-152006 discloses a technique of detecting the focus at high accuracy by performing appropriate signal processing even in a situation in which an eclipse occurs in the optical system of a focus detection apparatus.

However, it is sometimes difficult for the conventional techniques disclosed in these patent literatures to obtain an appropriate image in a situation in which an eclipse occurs. More specifically, Japanese Patent Laid-Open No. 2009-175680 does not disclose a method which copes with the angle accuracy of the photographing lens upon an eclipse. Japanese Patent Laid-Open No. 2010-152006 does not disclose an output image generation method in a light field camera in consideration of an eclipse.

SUMMARY OF THE INVENTION

The present invention has been made to solve the above-described problems, and provides an image capture apparatus functioning as a light field camera capable of obtaining a high-quality output image even in a situation in which an eclipse is generated by a photographing lens or the like.

According to the first aspect of the present invention, there is provided an image capture apparatus comprising: an imaging optical system; an image sensor; a pupil division unit which limits a light beam entering each pixel on the image sensor to a specific pupil area of the imaging optical system; an incident angle determination unit which determines an incident angle to each pixel on the image sensor; an image shift unit which shifts an electric signal obtained from the image sensor, based on the incident angle determined by the incident angle determination unit and a position of a plane on which image generation is performed; and an image generation unit which synthesizes electric signals obtained from the image shift unit.

According to the second aspect of the present invention, there is provided an image capture apparatus comprising: an imaging optical system; an image sensor; a pupil division unit which limits a light beam entering each pixel on the image sensor to a specific pupil area of the imaging optical system; an eclipse determination unit which determines an eclipse in each pixel on the image sensor; an image shift unit which gives a shift to an electric signal obtained from the image sensor for each passing pupil area; and an image generation unit which synthesizes electric signals obtained from the image shift unit, excluding an area where an eclipse is determined by the eclipse determination unit to have occurred.

Further features of the present invention will become apparent from the following description of exemplary embodiments with reference to the attached drawings.

BRIEF DESCRIPTION OF THE DRAWINGS

FIGS. 2A to 2C are views for explaining the main part of an imaging optical system in an embodiment of the present invention;

FIGS. 3A to 3D are flowcharts showing an operation of obtaining an image in the embodiment of the present invention;

FIGS. 7A to 7D are flowcharts showing another example of the present invention.

DESCRIPTION OF THE EMBODIMENTS

A preferred embodiment of the present invention will now be described in detail with reference to the accompanying drawings.

Figure 1:
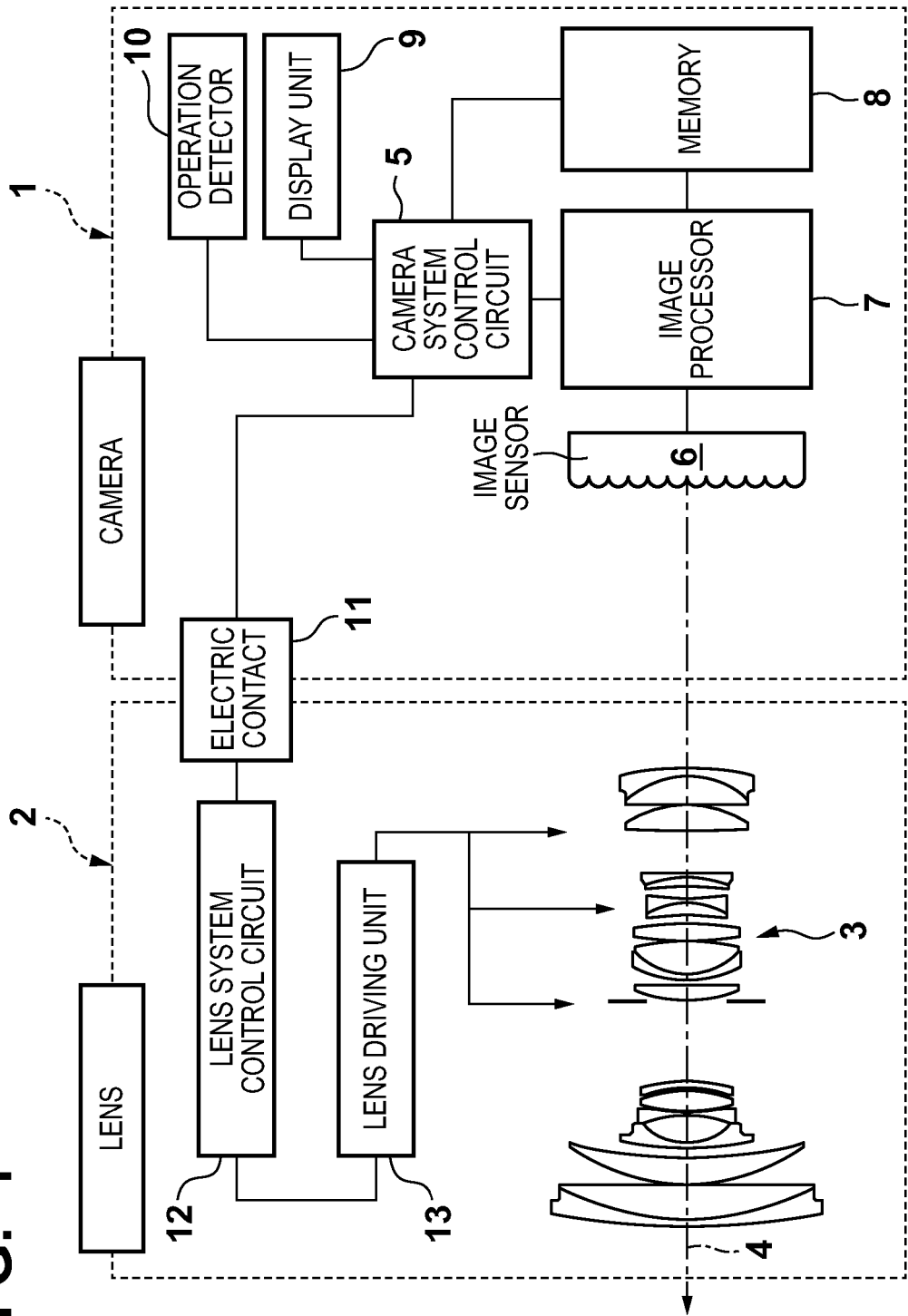
FIG. 1 is a block diagram showing the electrical arrangement of a digital camera and lens as an embodiment of an image capture apparatus according to the present invention.

FIG. 1 is a block diagram showing the electrical arrangement of a digital camera and lens as an embodiment of an image capture apparatus according to the present invention. A camera system formed from a camera 1 and lens (photographing lens) 2 includes an imaging system, image processing system, recording/reproduction system, and control system. The imaging system includes an imaging optical system 3 and image sensor 6. The image processing system includes an image processor 7. The recording/reproduction system includes a memory 8 and display unit 9. The control system includes a camera system control circuit 5, operation detector 10, lens system control circuit 12, and lens driving unit 13. The lens driving unit 13 can drive a focus lens, blur correction lens, stop, and the like.

The imaging system is an optical processing system which forms light traveling from an object into an image on the image sensing surface of the image sensor 6 via the imaging optical system 3. The image sensor 6 convers the formed optical image into a predetermined electric signal. Microlenses are arrayed on the surface of the image sensor 6, and form a so-called microlens array (to be referred to as an MLA hereinafter). In the embodiment, the MLA forms a pupil division means. Details of the function and arrangement of the MLA will be described later with reference to FIGS. 2A to 2C. As will be described later, a focus evaluation amount/correct exposure amount is obtained from the image sensor 6. By appropriately adjusting the imaging optical system 3 based on this signal, the image sensor 6 is exposed with an appropriate amount of object light, and a subject image is formed near the image sensor 6.

The image processor 7 incorporates an A/D converter, white balance circuit, gamma correction circuit, interpolation calculation circuit, and the like, and can generate a recording image. Also, the image processor 7 can incorporate an image shift means, image generation means, contrast evaluation means, correlation calculation means, and the like, which are main elements of the embodiment. However, the embodiment will be explained on the assumption that these elements are arranged in the lens system control circuit 12.

The memory 8 includes a processing circuit necessary for recording, in addition to an actual storage unit. The memory 8 performs output to the recording unit, and generates and saves an image to be output to the display unit 9. The memory 8 compresses images, movies, sounds, and the like by using predetermined methods.

The camera system control circuit 5 generates and outputs a timing signal and the like in image capturing. The camera system control circuit 5 controls the imaging system, image processing system, and recording/reproduction system in response to an external operation. For example, when the operation detector 10 detects pressing of a shutter release button (not shown), the camera system control circuit 5 controls driving of the image sensor 6, the operation of the image processor 7, compression processing of the memory 8, and the like. Also, the camera system control circuit 5 controls the state of each segment of an information display device which displays information on a liquid crystal monitor or the like by the display unit 9.

Next, an optical system adjustment operation by the control system will be explained. The image processor 7 is connected to the camera system control circuit 5, and obtains an appropriate focus position and stop position based on a signal from the image sensor 6. The camera system control circuit 5 issues an instruction to the lens system control circuit 12 via an electric contact 11, and the lens system control circuit 12 appropriately controls the lens driving unit 13. A camera shake detection sensor (not shown) is connected to the lens system control circuit 12. In a camera shake correction mode, the lens system control circuit 12 appropriately controls the blur correction lens via the lens driving unit 13 based on a camera shake detection sensor signal.

FIGS. 2A to 2C are views for explaining the main part of the imaging optical system in the embodiment. In the embodiment, it is necessary to acquire angle information, in addition to a ray position called ray space information. In the embodiment, the MLA is arranged near the imaging plane of the imaging optical system 3 in order to acquire angle information, and a plurality of pixels correspond to one lens forming the MLA.

FIG. 2A is a view schematically showing the relationship between the image sensor 6 and an MLA 20. FIG. 2B is a schematic view showing the correspondence between the pixel of the image sensor and the MLA. FIG. 2C is a view showing association of a pixel arranged below the MLA with a specific pupil area by the MLA.

As shown in FIG. 2A, the MLA 20 is arranged on the image sensor 6. The front principal point of the MLA 20 is arranged near the imaging plane of the imaging optical system 3. FIG. 2A shows states of the MLA when viewed from the side and front of the image capture apparatus. When viewed from the front of the image capture apparatus, the MLA is arranged so that its lenses cover pixels on the image sensor 6. Note that each microlens forming the MLA is enlarged in FIG. 2A for easy to see. In practice, the size of each microlens is merely about several times of the pixel size. The actual size will be explained with reference to FIG. 2B.

FIG. 2B is a partially enlarged front view of the apparatus in FIG. 2A. Grids in FIG. 2B represent the respective pixels of the image sensor 6. Respective microlenses forming the MLA are represented by thick circles 20*a*, 20*b*, 20*c*, and 20*d*. As is apparent from FIG. 2B, a plurality of pixels are assigned to one microlens. In the example of FIG. 2B, 5×5=25 pixels are arranged for one microlens. That is, the size of each microlens is 5×5 times larger than the size of each pixel.

FIG. 2C is a sectional view of the image sensor 6 so that the longitudinal direction of the sensor including the optical axis of the microlens coincides with the lateral direction in FIG. 2C. In FIG. 2C, reference numerals 21, 22, 23, 24, and 25 denote pixels (one photoelectric conversion unit) of the image sensor 6. An upper view in FIG. 2C shows the exit pupil plane of the imaging optical system 3. When the direction of the upper view is made to coincide with that of the lower view in FIG. 2C, the exit pupil plane is in a direction perpendicular to the sheet surface of FIG. 2C in practice. However, the projection direction is changed for descriptive convenience. Also, in FIG. 2C, one-dimensional projection/signal processing will be explained for descriptive convenience. This can be easily expanded two-dimensionally in an actual apparatus.

The pixels 21, 22, 23, 24, and 25 in FIG. 2C are positioned in correspondence with 21*a*, 22*a*, 23*a*, 24*a*, and 25*a* in FIG. 2B. As shown in FIG. 2C, each pixel is designed to be conjugate to a specific area on the exit pupil plane of the imaging optical system 3 via the MLA 20. In the example of FIG. 2C, the pixel 21 and an area 31 correspond to each other, the pixel 22 and an area 32 correspond to each other, the pixel 23 and an area 33 correspond to each other, the pixel 24 and an area 34 correspond to each other, and the pixel 25 and an area 35 correspond to each other. That is, only a light beam having passed through the area 31 on the exit pupil plane of the imaging optical system 3 enters the pixel 21. This also applies to the remaining pixels. As a result, angle information can be acquired from the relationship between a passing area on the pupil plane and a position on the image sensor 6.

To facilitate a subsequent description, symbols will be introduced. As shown in FIG. 2C, $\Delta x$ is the pixel pitch of the image sensor 6, and $\Delta \theta$ is the angular resolution. Further, $N\theta$ is the angle division count (In the example of FIG. 2C, $N\theta=5$). The pixel pitch is determined by the shape of the image sensor 6, and $\Delta \theta$ is determined by the range where the angles of rays are acquired, and the angle division count $N\theta$. That is, these parameters are determined by only the physical structure (the structures of the image sensor 6 and MLA 20).

A method of obtaining, by using the imaging optical system according to the embodiment, an image in which the influence of an eclipse is appropriately processed from the signal of the image sensor 6 will be explained with reference to FIGS. 3A to 6.

FIGS. 3A to 3D are flowcharts showing an operation of obtaining an image in the embodiment. FIG. 3A shows an overall operation of obtaining an image. FIG. 3B shows the operation of the image shift means. FIG. 3C shows the operation of the image generation means. FIG. 3D shows the operation of the correlation calculation means.

The operation will be explained step by step from FIG. 3A. Step S1 represents the start of an image acquiring operation.

For example, the image acquiring operation starts when the operation detector 10 in FIG. 1 detects a specific operation from the user (for example, pressing of the release button).

In step S2, the image sensor 6 is exposed for a proper time, and data is read out (A/D-converted) and acquired.

In step S3, the correlation calculation means operates to obtain the result. Information about a focus evaluation value is obtained from the correlation calculation means. Details of this operation will be described later with reference to FIG. 3D.

In step S4, a focus position is determined for each appropriately divided area (corresponding to an evaluation frame in step S62, which will be explained later in a description of the correlation calculation means). A position where the focus evaluation value obtained from the correlation calculation means (to be described later) becomes best is defined as a focus position. Note that "best" corresponds to a small value according to a correlation calculation equation in step S66 (to be described later).

This focus position indicates a relative focus shift from a current focus position. More specifically, the focus position of a subject in focus at the current focus position is obtained as 0, and those of subjects before and after this subject are obtained as positive and negative values. Further, the focus position indicates not the depth on the subject side, but the position of the imaging plane on the image plane side.

In step S5, the image shift means operates to obtain the result. The image generation position at this time can be obtained by several methods. For example, the focus position may be given by combining the focus position of each area obtained in step S4 and a subject recognition result. The focus can therefore be adjusted to an object recognized as a subject. As another method, a user-designated position can be given. This can implement so-called manual focusing. Details of the operation of the image shift means will be described later with reference to FIG. 3B.

In step S6, the image generation means operates to obtain the result. Details of the operation of the image generation means will be described later with reference to FIG. 3C. In step S7, the image undergoes proper processes such as conversion into a recording image format and compression, and then is recorded in the memory 8.

In step S8, a series of operations from image acquisition to recording ends.

Details of the operation of the image shift means will be explained with reference to FIG. 3B. Step S21 represents the state of the operation of the image shift means.

Steps S22 to S26 form a loop. In step S22, loop calculation is executed by the number of times corresponding to the pupil division count. In the example shown in FIGS. 2A to 2C, the pupil is divided into 25, so calculation is executed in accordance with the 25 pupil positions. As will be described later with reference to FIGS. 5A to 5E, considering image reconstruction, if the incident angle changes even on the same reconstruction plane (almost synonymous with a change of the passing pupil area when the exit pupil is sufficiently far), the amount by which the image is shifted changes. This loop appropriately reflects the image shift amount.

In step S23, an image shift amount in each pupil area corresponding to an evaluation position is calculated based on data obtained in steps S24 and S25. In step S25, information such as a pupil distance obtained from the lens in shooting, a set f-number, and the image height of a pixel being processed is stored. In step S25, the correspondence between each pixel and the MLA is saved, and information representing a pupil area, a ray from which pupil area is received by each pixel is stored. A conversion operation into a shift amount based on these pieces of information will be described in detail later with reference to FIGS. 4 and 5A to 5E. Since an incident angle considering an eclipse and the like is obtained and converted into a shift amount in steps S23, S24, and S25, this part corresponds to an incident angle determination means.

In step S25, pixels which receive rays having the same incident angle (receive rays from the same pupil area) are shifted based on the information in step S23. Pixels which receive rays having the same incident angle are, for example, 25a and 25b in FIG. 2B. Such pixels exist by the number of microlenses forming the MLA. The image shift means will be illustrated later with reference to FIGS. 4 and 5A to 5E.

In step S27, the process returns to calling source steps S4 and S77.

Details of the operation of the image generation means will be explained with reference to FIG. 3C. Step S31 represents the start of the operation of the image generation means.

In step S32, area data for addition in step S35 is initialized (padded with 0). The size of the data area at this time suffices to be the quantity of the MLA. It is convenient that the data grayscale can store the product of the grayscale of original data and the pupil division count. For example, when original data is formed from 8 bits and the pupil division count is 25, 13 bits (>8 bits+$\log_2$ 25) are sufficient and no data overflow need be taken into consideration.

Steps S33 to S38 form a loop. In step S33, loop calculation is executed by the number of microlenses forming the MLA. In the example shown in FIGS. 2A to 2C, the number of pixels of the original image sensor÷25 (pupil division count)=the number of microlenses.

Steps S34 to S37 form a loop. In step S34, loop calculation is executed by the number of times corresponding to the pupil division count. In the example shown in FIGS. 2A to 2C, the pupil is divided into 25, so light beams from the 25 pupil positions are processed.

In step S35, whether the current pupil area is a pupil area to be added is determined. More specifically, an area to be added is changed in accordance with user settings, providing an image the user intends. In general, increasing the number of pupil areas to be added provides a shallower-focal-depth image at a high S/N ratio, and decreasing it provides a deep-focal-depth image at a low S/N ratio.

In step S36, addition is performed. If the shift amount is not an integer multiple of pixels, it is appropriately divided internally and added in addition step S36. It is only necessary to appropriately add a shift amount in accordance with an overlapping area. The image generation means will be illustrated later with reference to FIG. 4.

In step S39, the process returns to calling source step S7.

Details of the operation of the correlation calculation means will be explained with reference to FIG. 3D. Step S61 represents the start of the operation of the correlation calculation means.

In step S62, the number of evaluation points for performing evaluation, and the size of an evaluation frame are set. This evaluation frame is preferably minimized as long as the correlation can be appropriately calculated against noise and the like. Hence, the focus position can be appropriately detected when performing defect correction.

Steps S63 to S69 form a loop. In step S63, calculation is repetitively performed to obtain evaluation values by the number of evaluations determined in step S62. Steps S64 to S67 form a loop. In step S64, correlation calculation is performed within the range of the number of pixels corresponding to the evaluation frame size determined in step S62.

In step S65, whether $A_i$ or $B_i$ is a defect is determined. If $A_i$ or $B_i$ is a defect, it cannot be used for correlation calculation, so the process advances to step S67; if it is not a defect, to step S66. The correlation can be calculated by $\Sigma|A_i-B_i|$, as in step S66. $A_i$ is the luminance of the ith pixel having passed through a specific pupil area. $B_i$ is the luminance of the ith pixel having passed through a specific pupil area different from that of $A_i$. For example, in FIGS. 2B and 2C, $A_i$ is the luminance of an array of only pixels corresponding to the pixel 22, and $B_i$ is the luminance of an array of only pixels corresponding to the pixel 24. A pixel of a pupil area to be selected can be determined based on the base-line length, the eclipse state of the pupil plane, and the like.

With the above settings, the correlation between images having passed through different pupil areas can be calculated, and an evaluation amount based on a so-called phase difference AF can be obtained. In step S68, the obtained correlation value is stored as an evaluation amount.

In the evaluation formula of $\Sigma\|A_i-B_i|$, a portion where the correlation value becomes minimum corresponds to a portion where the focus state is best. Although the correlation is calculated by a method of adding an absolute difference value, it may be calculated by another calculation method such as a method of adding a maximum value, a method of adding a minimum value, or a method of adding the square of a difference.

In step S69, the process returns to calling source step S7.

Figure 4:
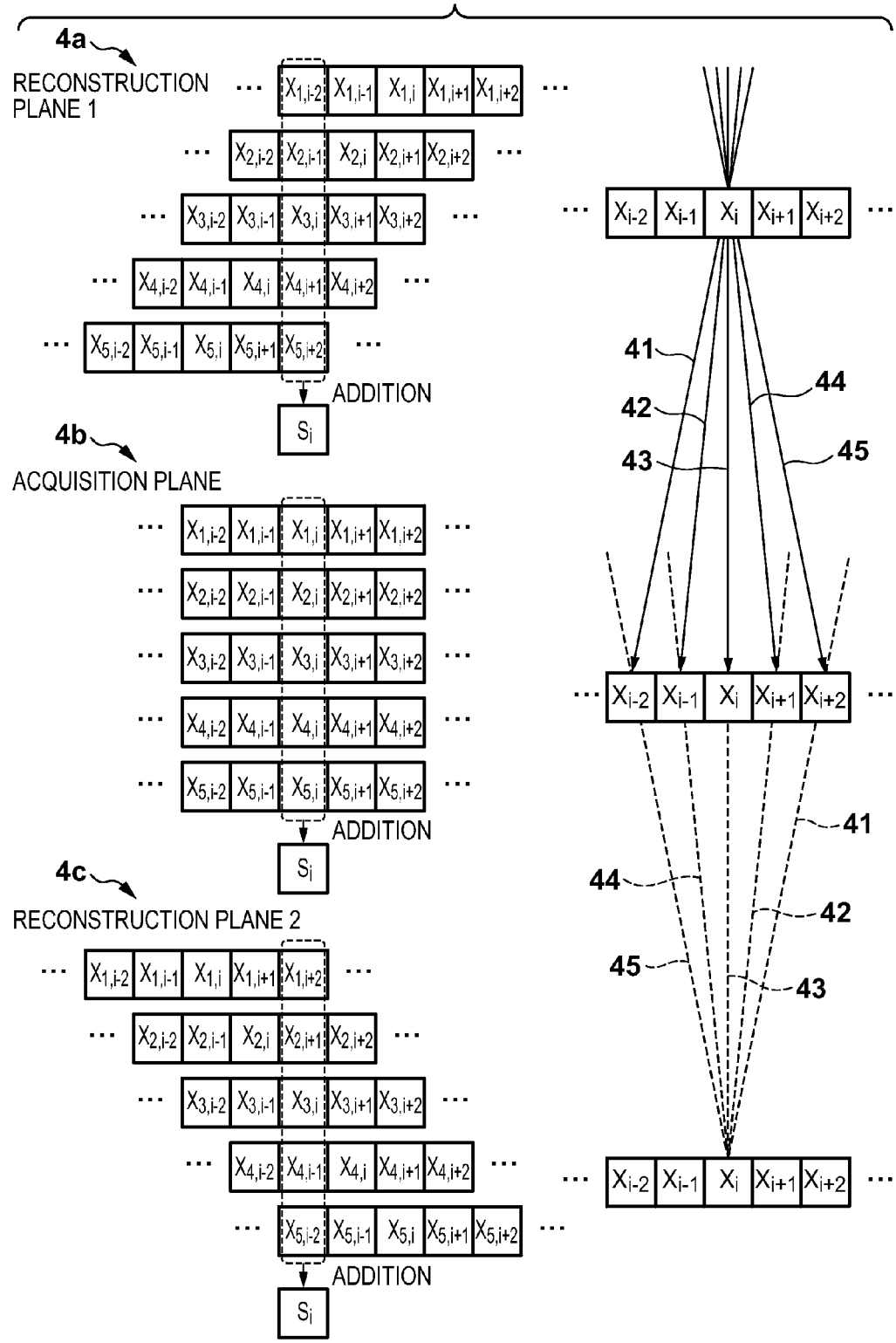
FIG. 4 is a view for explaining image reconstruction.

Next, the usefulness of contrast calculation by image reconstruction will be described with reference to FIG. 4 schematically showing image shift and image generation (image synthesis). In FIGS. 4, 4a, 4b, and 4c are aligned from the top. In FIG. 4, 4b represents a plane on which the image sensor 6 actually exists and an image is acquired. In FIG. 4, 4a represents a reconstruction plane (to be referred to as reconstruction plane 1) on the object side from 4b of FIG. 4. In FIG. 4, 4c represents a reconstruction plane (to be referred to as reconstruction plane 2) on a side farther from the object side than b of FIG. 4.

In 4b of FIG. 4, $X_{1,i}$, $X_{2,i}$, $X_{3,i}$, $X_{4,i}$, and $X_{5,i}$ are data obtained from light beams which have passed through pupil areas 1, 2, 3, 4, and 5 and entered a microlens $X_i$. The former letter of the suffix represents a passing pupil area, and the latter letter represents a pixel number. Also in FIG. 4, data is described to have only a one-dimensional spread for descriptive convenience. In the relationship with a physical position, $X_{1,i}$ is data obtained from the area 21 in FIG. 2C, and $X_{2,i}$ is data obtained from the area 22 in FIG. 2C. Similarly, suffixes "3", "4", and "5" correspond to the areas 23, 24, and 25, respectively.

To generate an image on the acquisition plane, data entering the microlens $X_i$ are added, as shown in b of FIG. 4. More specifically, the integral value of light entering $X_i$ in the angle direction can be obtained by $S_i=X_{1,i}+X_{2,i}+X_{3,i}+X_{4,i}+X_{5,i}$. As a result, an image identical to that by a normal camera is generated.

Next, an image generation method on reconstruction plane 1 will be examined. As described with reference to FIG. 1, the imaging optical system in the embodiment limits a light beam entering each pixel to a specific pupil area, so the incident angle is known in advance. The position of each pixel on the reconstruction plane is reconstructed along this angle. More specifically, a light beam having a pupil area suffix of 1, like $X_{1,i}$, is assumed to enter at an angle 41 on the right side of FIG. 4. Similarly, pupil area suffixes of 2, 3, 4, and 5 are assumed to correspond to 42, 43, 44, and 45, respectively. At this time, a light beam entering the microlens $X_i$ on reconstruction plane 1 disperses from $X_{i-2}$ to $X_{i+2}$ on the acquisition plane and enters. More specifically, the light beam disperses to $X_{1,i-2}$, $X_{2,i-1}$, $X_{3,i}$, $X_{4,i+1}$, $X_{5,i+2}$. To restore an image not only on $X_i$ but also on reconstruction plane 1, an image is shifted in accordance with the incident angle and added. To generate an image on reconstruction plane 1, a shift corresponding to an incident angle can be given by shifting right by two pixels an image having a pupil area suffix of 1, shifting right by one pixel an image having a pupil area suffix of 2, not shifting an image having a pupil area suffix of 3, shifting left by one pixel an image having a pupil area suffix of 4, and shifting left by two pixels an image having a pupil area suffix of 5. After that, data are added in the vertical direction in 4a of FIG. 4, obtaining data on reconstruction plane 1. More specifically, the integral value of light entering $X_i$ in the angle direction on reconstruction plane 1 can be obtained by $S_i=X_{1,i-2}+X_{2,i-1}+X_{3,i}+X_{4,i+1}+X_{5,i+2}$. In this manner, an image on the reconstruction plane can be obtained.

Assuming that a bright point exists in $X_i$ on reconstruction plane 1, it disperses to $X_{1,i-2}$, $X_{2,i-1}$, $X_{3,i}$, $X_{4,i+1}$, and $X_{5,i+2}$ and is in a so-called blurred state. However, when an image on reconstruction plane 1 is generated, the bright point is generated again in $X_i$, and a high-contrast image is obtained. That is, by reconstructing an image and calculating a contrast, so-called contrast AF can be performed.

As is apparent from 4c of FIG. 4, an image can be generated even on reconstruction plane 2 by completely the same way as on reconstruction plane 1. When the direction in which the reconstruction plane is arranged is different (this means an opposite side with respect to the object), the shift direction is only reversed.

Processing in a situation in which an eclipse occurs will be explained with reference to FIGS. 5A to 5E.

Figure 5A:
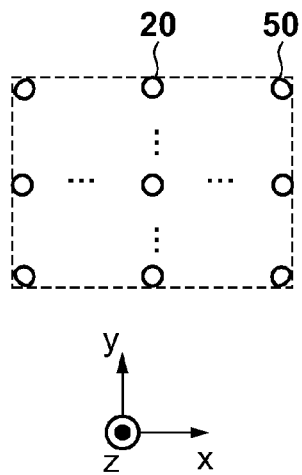
FIGS. 5A to 5E are views for explaining generation of an eclipse.
Figure 5B:
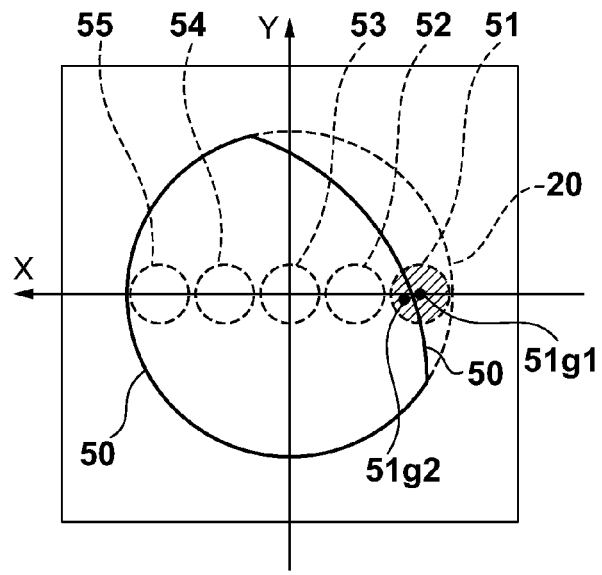
Figure 5C:
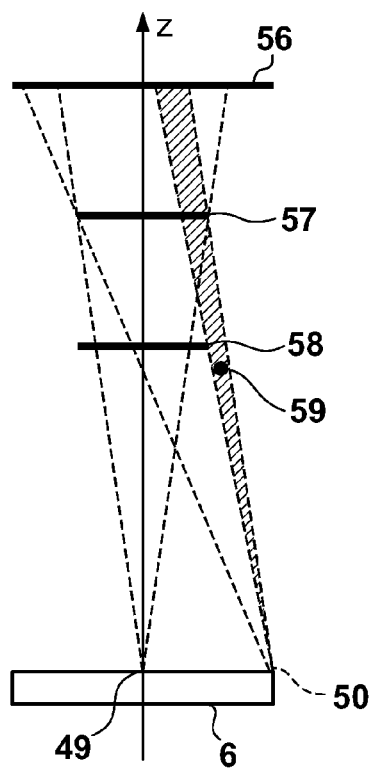
Figure 5D:
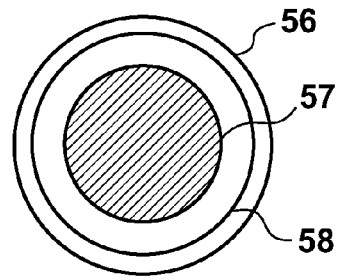
Figure 5E:
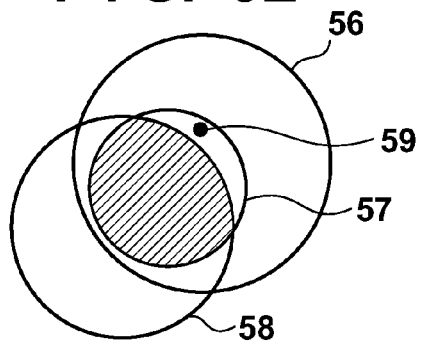

FIG. 5A is a view corresponding to FIG. 2A, shows the arrangement of the MLA, and also shows microlenses in detail, which will be enlarged and explained with reference to FIGS. 5B to 5D. FIG. 5B is a view corresponding to only the illustration of the exit pupil plane in FIG. 2C. FIGS. 5C to 5E are views for explaining states in which an eclipse occurs.

FIG. 5A shows a state of the MLA 20 when viewed from the front. Reference numeral 50 schematically denotes an image circle which is formed by a microlens at this position. Since the image circle 50 is reduced and shown in FIG. 5A and its shape is unclear, FIG. 5B enlarges and shows the image circle at this portion. The image circle 50 represents a complicated eclipse. In the example of FIG. 5B, the image circle 50 has a shape formed by two arcs. The shape of the microlens is a circle, but its image circle is not always a circle. This state will be explained below.

Generation of an eclipse will be described with reference to FIGS. 5C to 5E. FIG. 5C schematically shows the relationship between the image sensor 6, a stop 57, and various lens frames 56 and 58 (portions for holding a lens and the like, and generally frame members other than a possible portion of an end face which does not limit a ray at a frame center 49 but limits a ray depending on the image height, and also other than the pupil), and an eclipse. FIG. 5D is a view showing the positional relationship between the stop 57 and the lens frames 56 and 58 at the frame center 49. FIG. 5E is a view showing the positional relationship between the stop 57 and the lens frames 56 and 58 at a given point 50 on the image sensor 6.

For descriptive convenience, FIG. 5C shows one lens frame on the image sensor 6 side with respect to the stop 57, and one lens frame on the opposite side. However, FIG. 5C is a schematic view, and the number of lens frames is not limited to one on each side. In FIG. 5C, a thick straight line representing the stop 57 one-dimensionally represents an aperture size. An actual stop is almost circular, and the thick straight line schematically represents the diameter. This also applies to the lens frames 56 and 58. When viewed from the frame center 49, a ray traveling to the stop 57 is not eclipsed by the lens frames 56 and 58. FIG. 5D shows this state. In FIG. 5D, the stop 57 and the lens frames 56 and 58 are projected to the plane of the stop 57. At this time, the lens frame 56, stop 57, and lens frame 58 form concentric circles. Since the diameter of the stop 57 is smallest, the lens frames 56 and 58 do not generate an eclipse.

In contrast, when viewed from the point 50 having a predetermined image height, the lens frames 56 and 58 may generate an eclipse. In the example of FIGS. 5A to 5E, the lens frame 58 on the image sensor 6 side generates an eclipse. Reference numeral 59 denotes an area where an eclipse occurs. In FIG. 5E, similar to FIG. 5D, the stop 57 and the lens frames 56 and 58 are projected from the point 50 to the plane of the stop 57. This reveals that the lens frame 58 generates an eclipse.

As is apparent from FIGS. 5C to 5E, factors which determine an eclipse state are the pupil distance (in FIG. 5C, the distance between the image sensor 6 and the stop 57), the pupil diameter (=f-number: in FIG. 5C, the width of the stop 57), the image height (in FIG. 5C, expressed by the comparison between the frame center 49 and the given point 50 on the image sensor 6), the lens frame distance (in FIG. 5C, the distances between the image sensor 6 and the lens frames 56 and 58), and the lens frame diameter (in FIG. 5C, the widths of the lens frames 56 and 58). These pieces of information are acquired by, for example, communication with lenses in accordance with actual shooting conditions, and processing is appropriately performed. In FIG. 3B, these pieces of information are stored in step S24. Based on these pieces of information, an eclipse state on the pupil plane is determined, as shown in FIG. 5E. Further, information representing the correspondence between each pupil and each area is stored in step S25. Together with the information in step S24, the eclipse state of an area corresponding to each pupil is determined, like an area 51 in FIG. 5B.

As a result of generating an eclipse, the incident angle of the light beam of a pixel corresponding to the area 51 shown in FIG. 5B needs to be determined not based on a center 51$g$1 of gravity obtained in the absence of an eclipse, but based on a center 51$g$2 of gravity obtained in the presence of an eclipse. That is, an eclipse state is determined, the center of gravity is obtained, and an incident angle is determined in accordance with the center of gravity. The influence on the shift amount will be explained with reference to FIG. 6.

Figure 6:
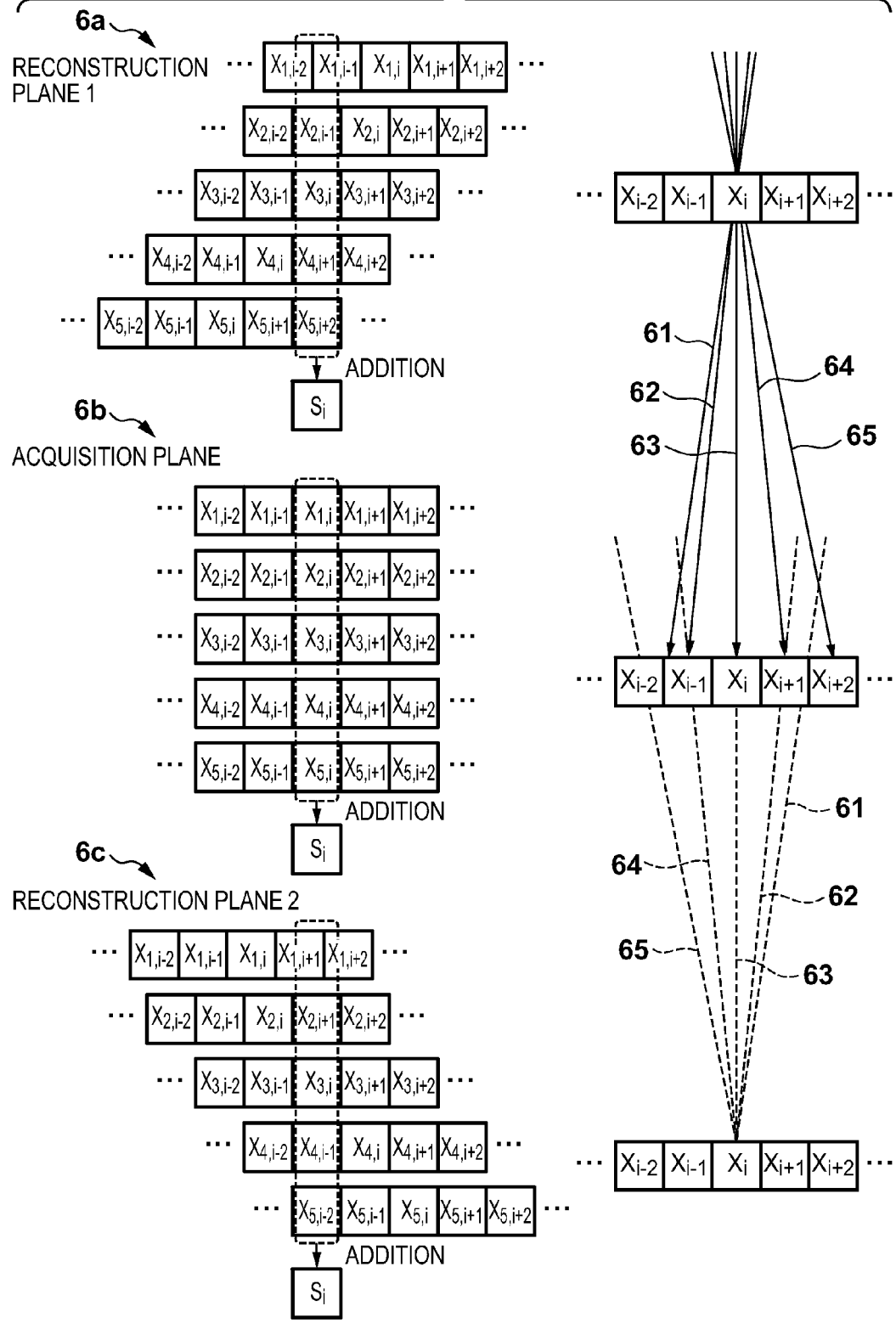
FIG. 6 is a view for explaining image reconstruction in a situation in which an eclipse occurs.

FIG. 6 is a view corresponding to FIG. 4, and schematically shows a case in which an eclipse occurs, unlike FIG. 4. In FIG. 6, similar to FIGS. 4, 4$a$, 4$b$, and 4$c$ are aligned from the top. In FIG. 6, 6$b$ represents a plane on which the image sensor 6 actually exists and an image is acquired. In FIG. 6, 6$a$ represents a reconstruction plane (to be referred to as reconstruction plane 1) on the object side from 6$b$ of FIG. 6. In FIG. 6, 6$c$ represents a reconstruction plane (to be referred to as reconstruction plane 2) on a side farther from the object side than b of FIG. 6. In FIG. 6, reference numerals 61, 62, 63, 64, and 65 denote light beams traveling from the area 51, and areas 52, 53, 54, and 55 in FIG. 5B.

In FIG. 4, data entering the microlens $X_i$ are added, and the integral value of light entering $X_i$ in the angle direction can be obtained by $S_i = X_{1,i} + X_{2,i} + X_{3,i} + X_{4,i} + X_{5,i}$. On reconstruction plane 1, the integral value of light entering $X_i$ in the angle direction can be obtained by $S_i = X_{1,i-2} + X_{2,i-1} + X_{3,i} + X_{4,i+1} + X_{5,i+2}$.

In FIG. 6, the ray 61 corresponding to the area 51 in FIG. 5B has a different angle from that in FIG. 4. For this reason, the shift amount on the reconstruction plane needs to be changed in accordance with this angle. For example, on reconstruction plane 1 shown in 6$a$ of FIG. 6, the integral value of light entering $X_i$ in the angle direction is obtained by $S_i = (X_{1,i-1} + X_{1,i-2})/2 + X_{2,i-1} + X_{3,i} + X_{4,i+1} + X_{5,i+2}$. In this case, the average $(X_{1,-1} + X_{1,i-2})/2$ of two adjacent data is used. Instead, it is also possible to use an appropriate interpolation function (for example, spline interpolation) or refer to a nearest neighbor value.

As is apparent from 6$c$ of FIG. 6, an image can be generated on reconstruction plane 2 in completely the same way as on reconstruction plane 1. When the direction in which the reconstruction plane is arranged is different, the shift direction is only reversed. With this setting, the integral value of light entering $X_i$ in the angle direction that considers an eclipse can be obtained by appropriate interpolation or the like even on reconstruction plane 2 shown in c of FIG. 6.

Figure 8A:
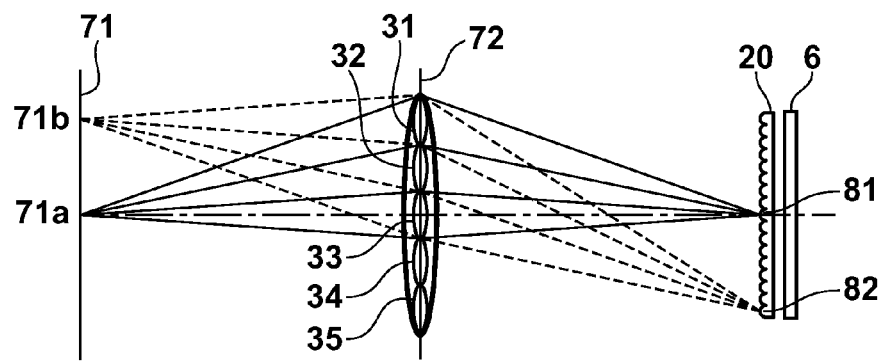
FIGS. 8A to 8C are views for explaining other optical systems suitable for the present invention.
Figure 8B:
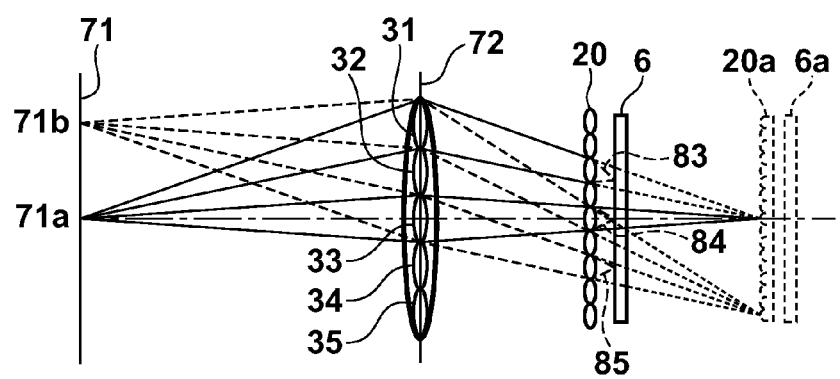
Figure 8C:
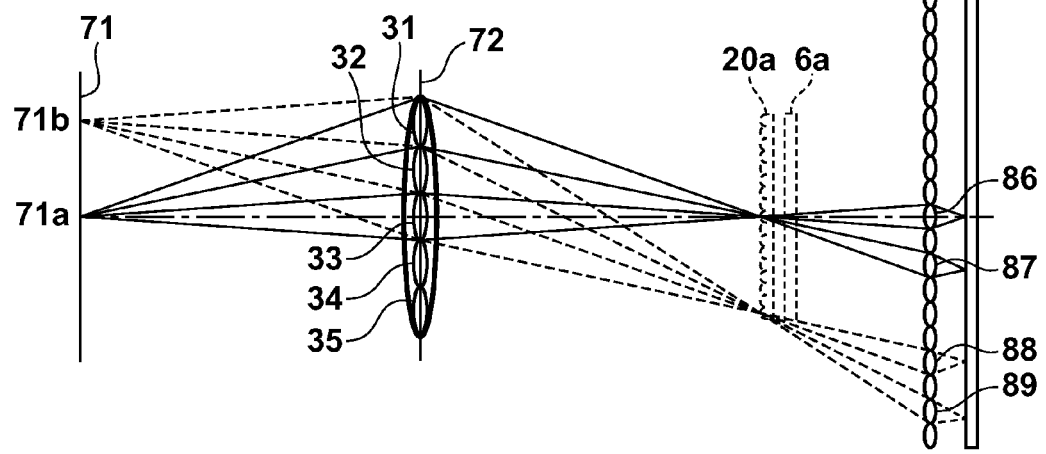

The method of specifying and correcting an eclipse state has been described with reference to FIGS. 5A to 5E and 6. As another measure against an eclipse, a pixel corresponding to an area where an eclipse occurs is not used. In the optical system described with reference to FIGS. 2A to 2C, pixels by the number of the square of the angle division count correspond to one microlens. In the example of FIGS. 2A to 2C, 5×5=25 pixels correspond to one microlens. Of these pixels, an eclipse occurs in 16 pixels, and no eclipse occurs in the remaining nine pixels. In this optical system, pixels corresponding to an area where an eclipse occurs occupy more than half the total pixels, and it is not practical not to use these pixels because the invalid pixel ratio becomes high. To the contrary, even if an optical system to be described larger with reference to FIGS. 8A to 8C is designed using the same angle division count, a larger number of pixels can correspond to one microlens. In such an optical system, the ratio of pixels where an eclipse occurs can be decreased. This is because the area (number of pixels) is proportional to the square of the size, but the circumference (pixels where an eclipse occurs) is proportional to the first power of the size. For example, assuming 10×10 pixels, the number of eclipse-free pixels is 52, which exceeds half the total pixels. In this case, even the method of not using pixels corresponding to an area where an eclipse occurs can be adopted as a simple and effective method.

FIGS. 7A to 7D are flowcharts in this case. The overall flow is the same as that in FIGS. 3A to 3D except that operations near step S23 are different. Based on information in step S24, eclipse determination is performed in step S23$a$. This part obviously operates as an eclipse determination means. If an eclipse has occurred, a flag indicating a pupil to be used for addition is canceled. With this setting, no addition is performed in step S35 for an area where an eclipse has occurred (an area where an eclipse has occurred is excluded). As a result, an image is reconstructed using only eclipse-free areas. In step S23$b$, the shift amount is calculated while ignoring the influence of an eclipse. In this case, instead of obtaining an angle considering an eclipse, as described in FIGS. 5A to 5E and 6, an eclipse-free state shown in FIG. 4 can be considered, reducing the calculation amount.

Other optical systems applicable to the embodiment will be exemplified with reference to FIGS. 8A to 8C. FIGS. 8A to 8C are views schematically showing a state in which a ray traveling from an object (subject) is imaged on the image sensor 6. FIG. 8A corresponds to the optical system described with reference to FIGS. 2A to 2C, and shows an example in which the MLA 20 is arranged near the imaging plane of the imaging optical system 3. FIG. 8B shows an example in which the MLA 20 is arranged closer to the object than the imaging plane of the imaging optical system 3. FIG. 8C shows an example in which the MLA 20 is arranged farther from the object than the imaging plane of the imaging optical system 3.

In FIGS. 8A to 8C, reference numeral 6 denotes an image sensor; 20, an MLA; 31 to 35, pupil areas used in FIGS. 2A to 2C; 71, an object plane; 71a and 71b, appropriate points on the object; 72, a pupil plane of the imaging optical system; and 81, 82, 83, 84, 85, 86, 87, 88, and 89, specific microlenses on the MLA. In FIGS. 8B and 8C, reference numeral 6a denotes a virtual image sensor; and 20a, a virtual MLA. The virtual image sensor 6a and virtual MLA 20a are illustrated for reference to clarify the correspondence with FIG. 8A. Solid lines indicate light beams which emerge from the point 71a on the object and pass through the areas 31 and 33 on the pupil plane. Broken lines indicate light beams which emerge from the point 71b on the object and pass through the areas 31 and 33 on the pupil plane.

In the example of FIG. 8A, as described with reference to FIGS. 2A to 2C, the MLA 20 is arranged near the imaging plane of the imaging optical system 3, so the image sensor 6 and the pupil plane 72 of the imaging optical system are conjugate to each other. Further, the object plane 71 and MLA 20 are conjugate to each other. Thus, a light beam emerging from the point 71a on the object reaches the microlens 81, a light beam emerging from the point 71b reaches the microlens 82, and light beams having passed through the areas 31 to 35 reach corresponding pixels arranged below the microlenses.

In the example of FIG. 8B, a light beam traveling from the imaging optical system 3 is imaged by the MLA 20, and the image sensor 6 is arranged on the imaging plane. In this arrangement, the object plane 71 and image sensor 6 are conjugate to each other. A light beam which has emerged from the point 71a on the object and passed through the area 31 on the pupil plane reaches the microlens 83, and a light beam which has emerged from the point 71a on the object and passed through the area 33 on the pupil plane reaches the microlens 84. A light beam which has emerged from the point 71b on the object and passed through the area 31 on the pupil plane reaches the microlens 84, and a light beam which has emerged from the point 71b on the object and passed through the area 33 on the pupil plane reaches the microlens 85. Light beams having passed through respective microlenses reach corresponding pixels arranged below them. In this manner, images are formed at different positions depending on points on the object and passing areas on the pupil plane. These images are rearranged at positions on the virtual image sensor 6a, obtaining the same information as that in FIG. 8A. That is, information about a passing pupil area (incident angle) and a position on the image sensor can be obtained.

In the example of FIG. 8C, a light beam traveling from the imaging optical system 3 is reimaged by the MLA 20 (called reimaging because a diffused light beam which has been imaged once is imaged), and the image sensor 6 is arranged on the imaging plane. In this arrangement, the object plane 71 and image sensor 6 are conjugate to each other. A light beam which has emerged from the point 71a on the object and passed through the area 31 on the pupil plane reaches the microlens 87, and a light beam which has emerged from the point 71a on the object and passed through the area 33 on the pupil plane reaches the microlens 86. A light beam which has emerged from the point 71b on the object and passed through the area 31 on the pupil plane reaches the microlens 89, and a light beam which has emerged from the point 71b on the object and passed through the area 33 on the pupil plane reaches the microlens 88. Light beams having passed through respective microlenses reach corresponding pixels arranged below them. Similar to FIG. 8B, images are rearranged at positions on the virtual image sensor 6a, obtaining the same information as that in FIG. 8A. That is, information about a passing pupil area (incident angle) and a position on the image sensor can be obtained.

FIG. 6 shows an example in which position information and angle information can be acquired using the MLA (phase modulation element) as a pupil division means. However, another optical arrangement is also available as long as position information and angle information (equivalent to limiting a passing area of the pupil) can be acquired. For example, a mask (gain modulation element) having an appropriate pattern can be inserted in the optical path of the imaging optical system.

As described above, according to the embodiment, even when an eclipse occurs in the imaging optical system, a high-quality image can be obtained based on lens information and the like in shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132364 filed Jun. 11, 2012, which is hereby incorporated by reference herein in its entirety.

What is claimed is:

1. An image capture apparatus comprising:
   an image sensor;
   a pupil division unit which divides a light beam entering an imaging optical system into each pixel on the image sensor;
   an incident angle determination unit which determines an incident angle to each pixel on the image sensor based on a center of gravity of a pupil area, in a presence of an eclipse, corresponding to each of the pixel on a two-dimensional pupil plane;
   an image shift unit which shifts an electric signal obtained from the image sensor in a direction in which the center of gravity is shifted by an eclipse on the two-dimensional pupil plane, based on the incident angle determined by the incident angle determination unit and a position of a plane on which image generation is performed; and
   an image generation unit which synthesizes electric signals obtained from the image shift unit.

2. The apparatus according to claim 1, wherein the incident angle determination unit calculates the incident angle based on information of a distance to a pupil of the imaging optical system.

3. The apparatus according to claim 1, wherein the incident angle determination unit calculates the incident angle based on information of a diameter of a pupil of the imaging optical system.

4. The apparatus according to claim 1, wherein the incident angle determination unit calculates the incident angle based on information of a distance to a frame member for limiting a ray, other than a pupil of the imaging optical system.

5. The apparatus according to claim 1, wherein the incident angle determination unit calculates the incident angle based on a position of a pixel to be processed on the image sensor.

6. The apparatus according to claim 1, wherein the incident angle determination unit calculates the incident angle based on information of the pupil division unit.

7. The apparatus according to claim 1, further comprising an eclipse determination unit which determines an eclipse in each pixel on the image sensor.

8. The apparatus according to claim 7, wherein the eclipse determination unit calculates the incident angle based on information of a diameter of a pupil of the imaging optical system and information of a distance to a pupil of the imaging optical system.

9. The apparatus according to claim 7, wherein the incident angle determination unit calculates the incident angle based on a position of a pixel to be processed on the image sensor and information of the pupil division unit.

10. An image capture apparatus comprising:
an imaging optical system;
an image sensor;
a pupil division unit which limits a light beam entering each pixel on said image sensor to a specific pupil area of said imaging optical system;
an eclipse determination unit which determines an eclipse in each pixel on said image sensor;
an incident angle determination unit which determines an incident angle to each pixel on the image sensor based on a center of gravity of a pupil area, in a presence of an eclipse, corresponding to each of the pixel on a two-dimensional pupil plane;
an image shift unit which gives a shift to an electric signal obtained from said image sensor for each passing pupil area; and
an image generation unit which synthesizes electric signals obtained from said image shift unit, excluding an area where an eclipse is determined by said eclipse determination unit to have occurred.

11. A method of controlling an image capture apparatus having an image sensor and a pupil division unit which divides a light beam entering an imaging optical system into each pixel on the image sensor, the method comprising:
determining an incident angle to each pixel on the image sensor based on a center of gravity of a pupil area, in a presence of an eclipse, corresponding to each of the pixel on a two-dimensional pupil plane;
shifting an electric signal obtained from the image sensor in a direction in which the center of gravity is shifted by an eclipse on the two-dimensional pupil plane, based on the incident angle determined by the determining and a position of a plane on which image generation is performed;
and
synthesizing electric signals obtained in the shifting.

* * * * *